United States Patent
Quach et al.

(10) Patent No.: US 10,247,099 B2
(45) Date of Patent: Apr. 2, 2019

(54) PEDESTALS WITH HEAT TRANSFER AUGMENTER

(71) Applicant: UNITED TECHNOLOGIES CORPORATION, Hartford, CT (US)

(72) Inventors: San Quach, East Hartford, CT (US); Thomas N. Slavens, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 414 days.

(21) Appl. No.: 15/023,010

(22) PCT Filed: Oct. 16, 2014

(86) PCT No.: PCT/US2014/060795
§ 371 (c)(1),
(2) Date: Mar. 18, 2016

(87) PCT Pub. No.: WO2015/065717
PCT Pub. Date: May 7, 2015

(65) Prior Publication Data
US 2016/0230664 A1 Aug. 11, 2016

Related U.S. Application Data (60) Provisional application No. 61/896,853, filed on Oct. 29, 2013.

(51) Int. Cl.
*F01D 5/18* (2006.01)
*F02C 7/18* (2006.01)
*F01D 25/12* (2006.01)

(52) U.S. Cl.
CPC ............... *F02C 7/18* (2013.01); *F01D 5/187* (2013.01); *F01D 25/12* (2013.01);
(Continued)

(58) Field of Classification Search
CPC ................. F01D 5/187; F01D 25/12
See application file for complete search history.

(56) References Cited

U.S. PATENT DOCUMENTS 5,772,397 A * 6/1998 Morris .................... F01D 5/187
 415/115
6,402,470 B1 * 6/2002 Kvasnak ................. F01D 5/187
 415/115

(Continued)

FOREIGN PATENT DOCUMENTS

EP 1091092 A2 4/2001

OTHER PUBLICATIONS

International Preliminary Report on Patentability for International Application No. PCT/US2014/060795 dated May 12, 2016.
(Continued)

*Primary Examiner* — Justin Seabe
*Assistant Examiner* — Behnoush Haghighian
(74) *Attorney, Agent, or Firm* — Carlson, Gaskey & Olds, P.C.

(57) ABSTRACT

A gas turbine engine component comprises a first side wall, and a second side wall spaced apart from the first side wall. At least one internal cooling channel is formed between the first and second side walls. At least one pedestal is positioned within the at least one cooling channel and has a body extending from a first end connected to the first side wall to a second end connected to the second side wall. The body includes at least one protrusion.

22 Claims, 6 Drawing Sheets

(52) U.S. Cl.
CPC .... *F05D 2250/181* (2013.01); *F05D 2250/20* (2013.01); *F05D 2250/23* (2013.01); *F05D 2250/25* (2013.01); *F05D 2250/281* (2013.01); *F05D 2260/2214* (2013.01); *F05D 2260/22141* (2013.01); *Y02T 50/676* (2013.01)

(56) References Cited

U.S. PATENT DOCUMENTS

| | | | | |
|---|---|---|---|---|
| 6,582,584 | B2 * | 6/2003 | Lee | B23H 9/00 |
| | | | | 205/640 |
| 6,997,675 | B2 * | 2/2006 | Dube | F01D 5/187 |
| | | | | 415/115 |
| 7,901,180 | B2 * | 3/2011 | Abdel-Messeh | F01D 5/187 |
| | | | | 415/115 |
| 7,938,624 | B2 * | 5/2011 | Tibbott | F01D 5/187 |
| | | | | 415/115 |
| 8,109,726 | B2 * | 2/2012 | Liang | F01D 5/187 |
| | | | | 416/97 R |
| 8,201,621 | B2 * | 6/2012 | Hatman | F01D 5/187 |
| | | | | 138/38 |
| 8,360,725 | B2 * | 1/2013 | Anguisola McFeat | |
| | | | | F01D 5/187 |
| | | | | 416/96 R |
| 8,894,367 | B2 * | 11/2014 | Lee | F01D 5/187 |
| | | | | 165/109.1 |
| 8,985,949 | B2 * | 3/2015 | Lee | F01D 5/187 |
| | | | | 416/97 R |
| 9,133,715 | B2 * | 9/2015 | Lutjen | F01D 5/187 |
| 9,243,502 | B2 * | 1/2016 | Xu | B22C 9/18 |
| 9,297,261 | B2 * | 3/2016 | Otero | F01D 5/187 |
| 9,771,809 | B2 * | 9/2017 | Fujimoto | F01D 5/189 |
| 9,879,546 | B2 * | 1/2018 | Hudson | F01D 5/187 |
| 2005/0135922 | A1 | 6/2005 | Cherolis et al. | |
| 2007/0286735 | A1 | 12/2007 | Cunha et al. | |
| 2007/0297916 | A1 * | 12/2007 | Levine | F01D 5/187 |
| | | | | 416/96 R |
| 2008/0063524 | A1 | 3/2008 | Tibbott | |
| 2013/0232991 | A1 | 9/2013 | Otero | |
| 2013/0243575 | A1 | 9/2013 | Zelesky et al. | |
| 2014/0161625 | A1 * | 6/2014 | Zhang | F01D 5/187 |
| | | | | 416/96 R |
| 2014/0290256 | A1 | 10/2014 | Fujimoto et al. | |
| 2015/0110601 | A1 * | 4/2015 | Ahmad | F01D 9/065 |
| | | | | 415/115 |

OTHER PUBLICATIONS

International Search Report from corresponding PCT/US14/60795.
Supplementary European Search Report for European Application No. 14857112.8 dated May 16, 2017.

\* cited by examiner

PEDESTALS WITH HEAT TRANSFER AUGMENTER

CROSS-REFERENCE TO RELATED APPLICATION

This application claims priority to U.S. Provisional Application No. 61/896,853, filed Oct. 29, 2014.

BACKGROUND OF THE INVENTION

Thrust and efficiency of gas turbine engines can be improved by increasing rotor inlet temperatures from combustion. This can result in downstream gas path components, such as airfoils and outer air seals for example, encountering temperatures that may exceed the component's base metal melting point. Consequently, these components can experience damage modes such as oxidation, erosion, creep, melting, and thermal-mechanical fatigue.

To protect against this type of potential damage, internal geometries of these components are designed with features that promote convective heat transfer augmentation with coolant air from a compressor. One example of such a heat transfer augmentation technology is a pin-fin or pedestal array. These structures have round or race-track shapes that increase the wetted surface area and turbulate the flow for heat transfer.

SUMMARY OF THE INVENTION

In a featured embodiment, a gas turbine engine component comprises a first side wall, and a second side wall spaced apart from the first side wall. At least one internal cooling channel is formed between the first and second side walls. At least one pedestal is positioned within the at least one cooling channel and has a body extending from a first end connected to the first side wall to a second end connected to the second side wall. The body includes at least one protrusion.

In another embodiment according to the previous embodiments, at least one protrusion comprises a plurality of protrusions that are spaced from the first and second side walls, and wherein the plurality of protrusions are configured to generate a vortex downstream of the at least one pedestal.

In another embodiment according to any of the previous embodiments, the plurality of protrusions comprise a plurality of gear teeth spaced apart from each other.

In another embodiment according to any of the previous embodiments, the body defines a central axis extending from the first end to the second end. The gear teeth extend radially outwardly relative to the central axis to define a tooth height and extend in an axial direction that is generally parallel to the central axis to define a tooth length that is greater than the tooth height.

In another embodiment according to any of the previous embodiments, the body defines a central axis extending from the first end to the second end. The gear teeth extend circumferentially about the body and are axially spaced apart from each other in a direction along the central axis.

In another embodiment according to any of the previous embodiments, the body defines a central axis extending from the first end to the second end. The gear teeth extend around the body such that each tooth is orientated at an oblique angle relative to the central axis.

In another embodiment according to any of the previous embodiments, the body defines a central axis extending from the first end to the second end. The plurality of protrusions comprise a helical feature that is orientated at an obtuse angle relative to the central axis.

In another embodiment according to any of the previous embodiments, the body defines a central axis extending from the first end to the second end. The plurality of protrusions are orientated at an obtuse angle relative to the central axis.

In another embodiment according to any of the previous embodiments, at least one protrusion includes a first angled surface to direct cooling flow toward one of the first and second side walls.

In another embodiment according to any of the previous embodiments, at least one protrusion includes a first angled surface to direct cooling flow toward the first side wall and at least one other protrusion includes a second angled surface to direct cooling flow toward the second side wall.

In another embodiment according to any of the previous embodiments, the component comprises an airfoil.

In another featured embodiment, a gas turbine engine comprises a compressor section, a combustor section downstream of the compressor section, and a turbine section downstream of the combustor section. The turbine section includes at least one component comprising a first side wall. A second side wall is spaced apart from the first side wall. At least one internal cooling channel is formed between the first and second side walls, and at least one pedestal is positioned within the at least one cooling channel and has a body extending from a first end connected to the first side wall to a second end connected to the second side wall. The body includes at least one protrusion.

In another embodiment according to the previous embodiment, at least one protrusion comprises a plurality of protrusions that are spaced from the first and second side walls.

In another embodiment according to any of the previous embodiments, the plurality of protrusions comprise a plurality of gear teeth spaced apart from each other.

In another embodiment according to any of the previous embodiments, the plurality of protrusions comprise a helical feature.

In another embodiment according to any of the previous embodiments, the body defines a central axis extending from the first end to the second end. The plurality of protrusions are orientated at an obtuse angle relative to the central axis.

In another embodiment according to any of the previous embodiments, at least one protrusion includes a first angled surface to direct cooling flow toward the first side wall and at least one other protrusion includes a second angled surface to direct cooling flow toward the second side wall.

In another embodiment according to any of the previous embodiments, the component comprises an airfoil where the first side wall comprises a pressure side wall and the second side wall comprises a suction side wall. The pressure and suction side walls connect a leading edge to a trailing edge of the at least one airfoil.

In another embodiment according to any of the previous embodiments, the body defines a central axis extending from the first end to the second end. At least one protrusion is positioned to direct cooling flow toward one of the first and second side walls.

In another embodiment according to any of the previous embodiments, the body defines a central axis extending from the first end to the second end. At least one protrusion comprises at least a first protrusion positioned to direct cooling flow toward the first side wall and a second protrusion positioned to direct cooling flow toward the second side wall.

The foregoing features and elements may be combined in any combination without exclusivity, unless expressly indicated otherwise.

These and other features may be best understood from the following drawings and specification.

DETAILED DESCRIPTION

Figure 1:
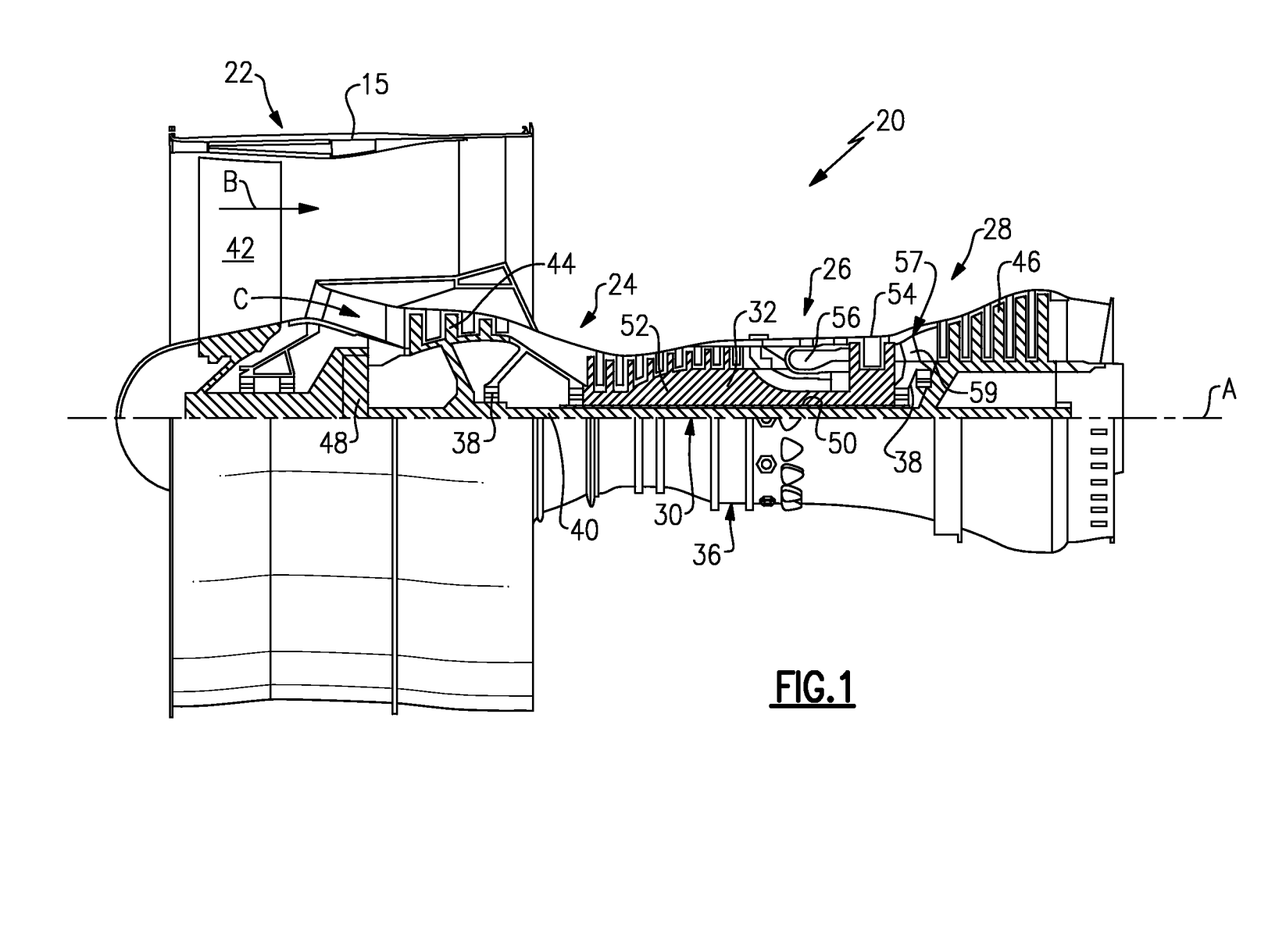
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \, °R)/(518.7° \, R)]^{0.5}$. The "Low corrected fan tip speed" as disclosed herein according to one non-limiting embodiment is less than about 1150 ft/second.

Figures 2, 3:
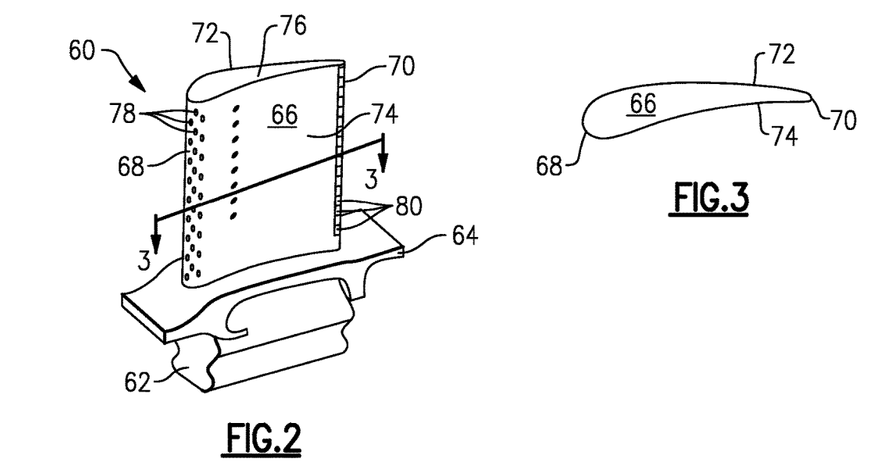
FIG. 2 is a perspective side view of a blade from a turbine section.
FIG. 3 is a section view taken at 3-3 in FIG. 2.

Airfoils located downstream of combustor section 26, such as stator vanes and rotor blades in the turbine section 28, for example, operate in a high-temperature environment. Airfoils that are exposed to high temperatures typically include internal cooling channels that direct a flow of cooling air through the airfoil to remove heat and prolong the useful life of the airfoil. FIG. 2 is a side view of a turbine rotor blade 60 having a root section 62, a platform 64, and an airfoil section 66. Root section 62 is connected to a rotor in the turbine section 28 (FIG. 1) as known. As shown in FIG. 3, the airfoil section 66 includes a leading edge 68, a trailing edge 70, a suction side wall 72, and a pressure side wall 74. The airfoil section 66 extends to a tip 76, and includes a plurality of surface cooling holes, such as film cooling holes 78, and a plurality of trailing edge cooling slots 80 as shown in FIG. 2.

The platform 64 connects one end of airfoil section 66 to root section 62. The leading edge 68, trailing edge 70, suction side wall 72, and pressure side wall 74 extend outwardly away from the platform 64. The tip 76 closes off an opposite end of the airfoil section 66 from the platform 64. Suction side wall 72 and pressure side wall 74 connect leading edge 68 and trailing edge 70. Film cooling holes 78 are arranged over a surface of airfoil section 66 to provide a layer of cool air proximate the surface of airfoil section 66 for protection from high-temperature combustion gases. Trailing edge cooling slots 80 are arranged along trailing edge 70 to provide an exit for air circulating within airfoil section 66.

Figure 4:
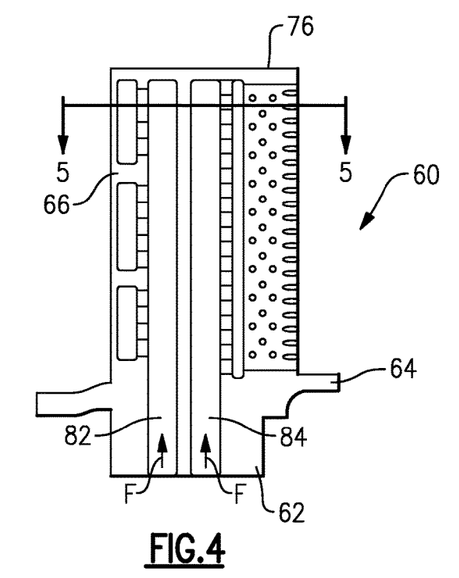
FIG. 4 is a cross-sectional view of the blade of FIG. 2.
Figure 5:
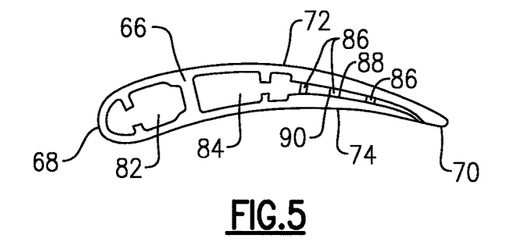
FIG. 5 is a section view taken at 5-5 of FIG. 4.

FIG. 4 is a section view of the rotor blade 60 of FIG. 2. The rotor blade 60 includes one or more internal cooling channels. In the example shown, there is a first cooling channel 82 near the leading edge 68, and a second cooling channel 84 positioned aft of the first cooling channel 82. The second cooling channel 84 includes a plurality of pedestals 86 as shown in FIG. 5. The first cooling channel 82 and second cooling channel 84 extend from the root section 62, through the platform 64, and into the airfoil section 66 as shown in FIG. 4. The film cooling holes 78 near leading edge 68 are in fluid communication with the first cooling channel 82. The balance of film cooling holes 78 and trailing edge slots 80 are in fluid communication with the second cooling channel 84.

The blade 60 is cooled by a flow of cooling fluid F entering the first cooling channel 82 and the second cooling channel 84 at root 62 (FIG. 4). The cooling fluid F entering the first cooling channel 82 internally cools a portion of the blade 60 near the leading edge 68 before flowing out through film cooling holes 78 near leading edge 68. The cooling fluid F entering the second cooling channel 84 internally cools a remaining portion of the blade 60 before flowing out through the balance of film cooling holes 78 and trailing edge slots 80. As the cooling fluid F flowing through the second cooling channel 84 nears the trailing edge 70, the cooling fluid F impinges on the plurality of pedestals 86. The pedestals 86 provide increased surface area for heat transfer from the blade 60 to the flow of cooling fluid F, as compared to portions of the second cooling channel 84 that do not have pedestals 86. Further, the pedestals 86 create turbulence in the flow of cooling fluid F to increase convective heat transfer.

FIG. 5 shows an enlarged cross-sectional view of the airfoil section 66. As shown, the leading edge 68 and trailing edge 70 are connected by the suction side wall 72 and pressure side wall 74. The pressure side wall 74 is spaced apart from the suction side wall 72 such that the first cooling channel 82 and second cooling channel 84 are formed therebetween. The film cooling holes 78 are in fluid communication with the first cooling channel 82 and second cooling channel 84. Each pedestal 86 within the second cooling channel 84 is connected on first end 88 to suction side wall 72 and connected on second end 90 to pressure side wall 74, and thus extends across the second cooling channel 84.

The pedestals 86 include one or more protrusions to further enhance heat transfer. The protrusions are spaced from the side walls 72, 74 and further increase the amount of surface area that is in contact with the cooling fluid F. The protrusions also cause a vortex generation downstream of the pedestal which increases "out-of-plane" secondary flows of the coolant fluid. FIGS. 6-15 show various examples of protrusions for the pedestals.

Figure 6:
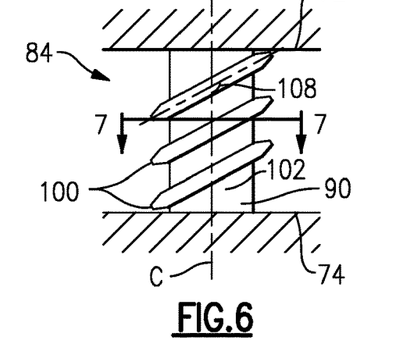
FIG. 6 is a schematic representation of one example of a pedestal.
Figures 7, 9, 10, 11, 12:
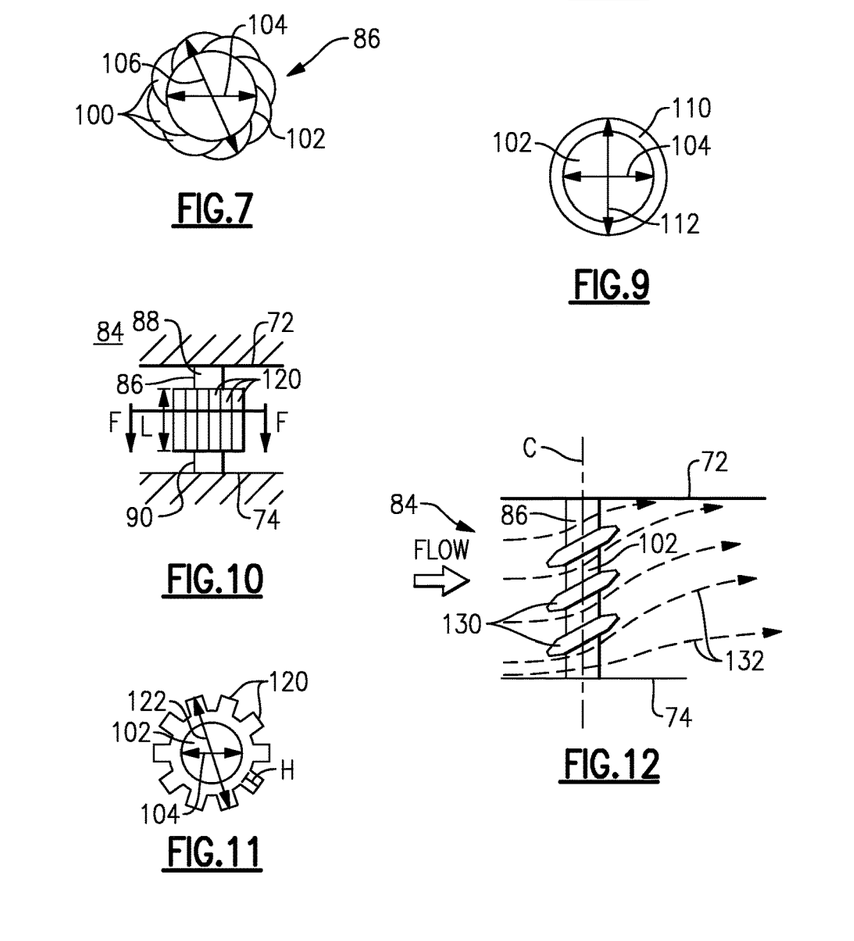
FIG. 7 is a section view taken at 7-7 of FIG. 6.
FIG. 9 is a section view taken at 9-9 of FIG. 8.
FIG. 10 is a schematic representation of another example of a pedestal.
FIG. 11 is a section view taken at 11-11 of FIG. 10.
FIG. 12 is a schematic representation of another example of a pedestal.

FIGS. 6-7 show an example where the pedestal 86 includes a plurality of protrusions 100 that comprise a helical feature, resembling a screw thread or gear teeth, for example. These protrusions act as turbulators (or trip strips) on the flow to enhance the turbulence and heat transfer. The pedestal 86 has a body 102 extending along a central axis C and is defined by a base diameter 104. The body 102 has a cylindrical, elliptical, or round shape for example. The protrusions 100 extend outwardly from an outer surface of the body 102 such that at a section taken through the protrusions, the pedestal 86 has an increased diameter 106 that is greater than the base diameter 104. The protrusions 100 extend radially outwardly from the body 102 relative to the central axis C. The protrusions 100 are orientated such that the protrusions extend at an oblique angle 108 relative to the central axis.

Figure 8:
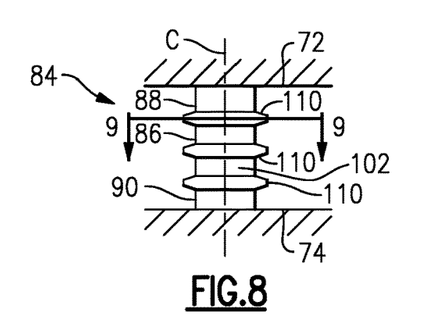
FIG. 8 is a schematic representation of another example of a pedestal.

In the example shown in FIGS. 8-9, the pedestal 86 includes a plurality of protrusions 110 that are formed as gear teeth or ribs that extend radially outwardly relative to the central axis C. The protrusions 110 extend circumferentially about the body 102 and are axially spaced apart from each other in a direction along the central axis C. The protrusions 110 extend radially outwardly from an outer surface of the body 102 such that at a section taken through the protrusions 110, the pedestal 86 has an increased diameter 112 that is greater than the base diameter 104.

In the example shown in FIGS. 10-11, the pedestal 86 includes a plurality of protrusions 120 that are formed as gear teeth or ribs that extend radially outwardly from the body 102 and are circumferentially spaced apart from each other about the central axis C. The protrusions 120 extend radially outwardly relative to the central axis C to define a rib or tooth height H and extend in an axial direction that is generally parallel to the central axis C to define a rib or tooth length L that is greater than the height H. The protrusions 120 extend radially outwardly from an outer surface of the body 102 such that at a section taken through the protrusions 120, the pedestal 86 has an increased diameter 122 that is greater than the base diameter 104.

In the example of FIG. 12, the pedestals include a plurality of protrusions 130 that are formed as fins or ribs that extend outwardly relative to the body 102. The protrusions 130 extend at an oblique angle relative to the central axis C. This orientation of the protrusions 130 further enhances the cooling effect as the angled surfaces direct flow toward one or more of the side walls 72, 74 as indicated by streamlines 132.

Figure 13:
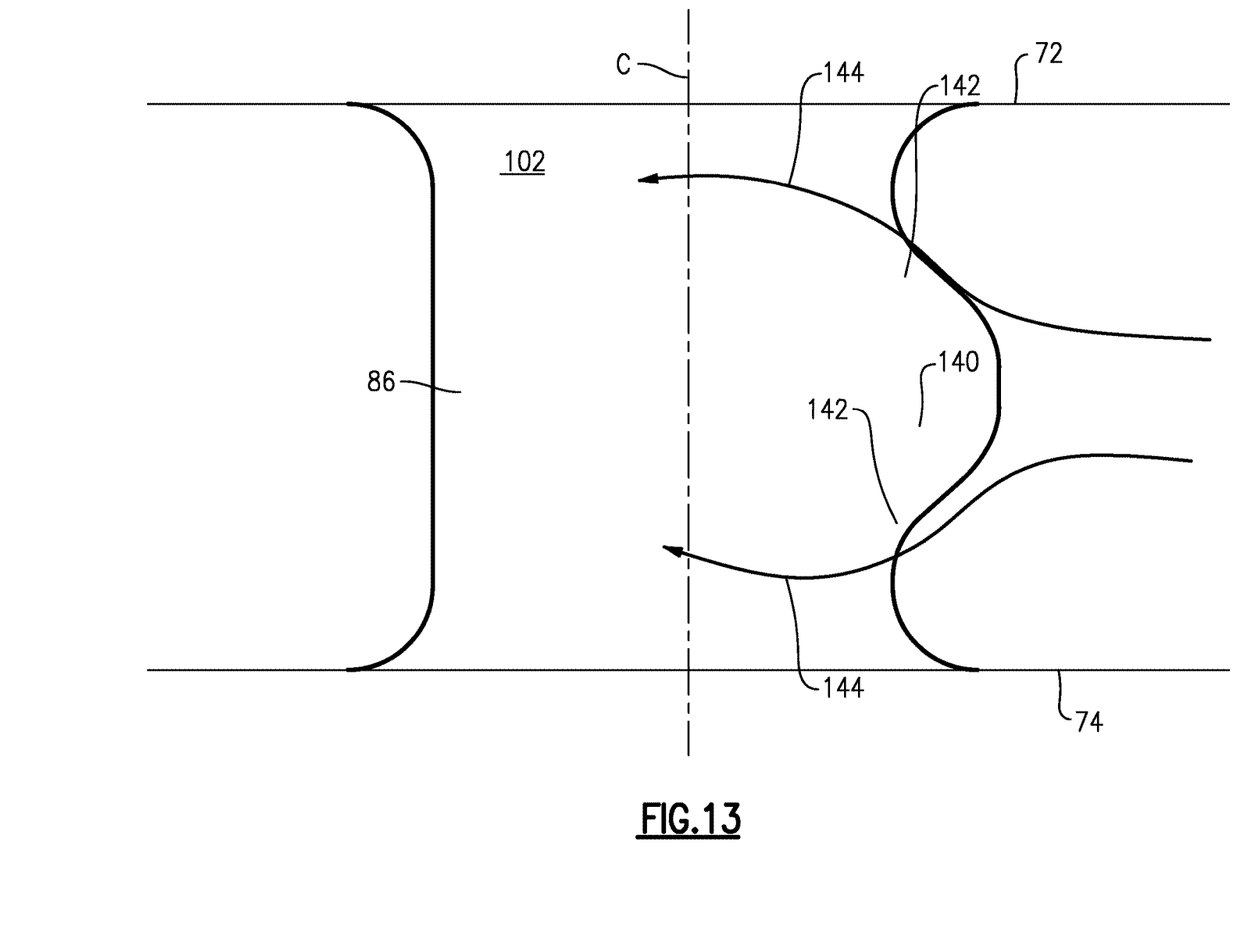
FIG. 13 is a schematic representation of another example of a pedestal.

FIG. 13 shows an example where the pedestal 86 includes one protrusion 140 that extends outwardly from an upstream side of the body 102. The protrusion 140 is generally centrally located along the body 102, i.e. the protrusion 140 is spaced from the side walls 72, 74. The protrusion 140 has one or more angled surfaces 142 that direct flow toward one or both of the side walls 72, 74 as indicated by streamlines 144.

Figure 14:
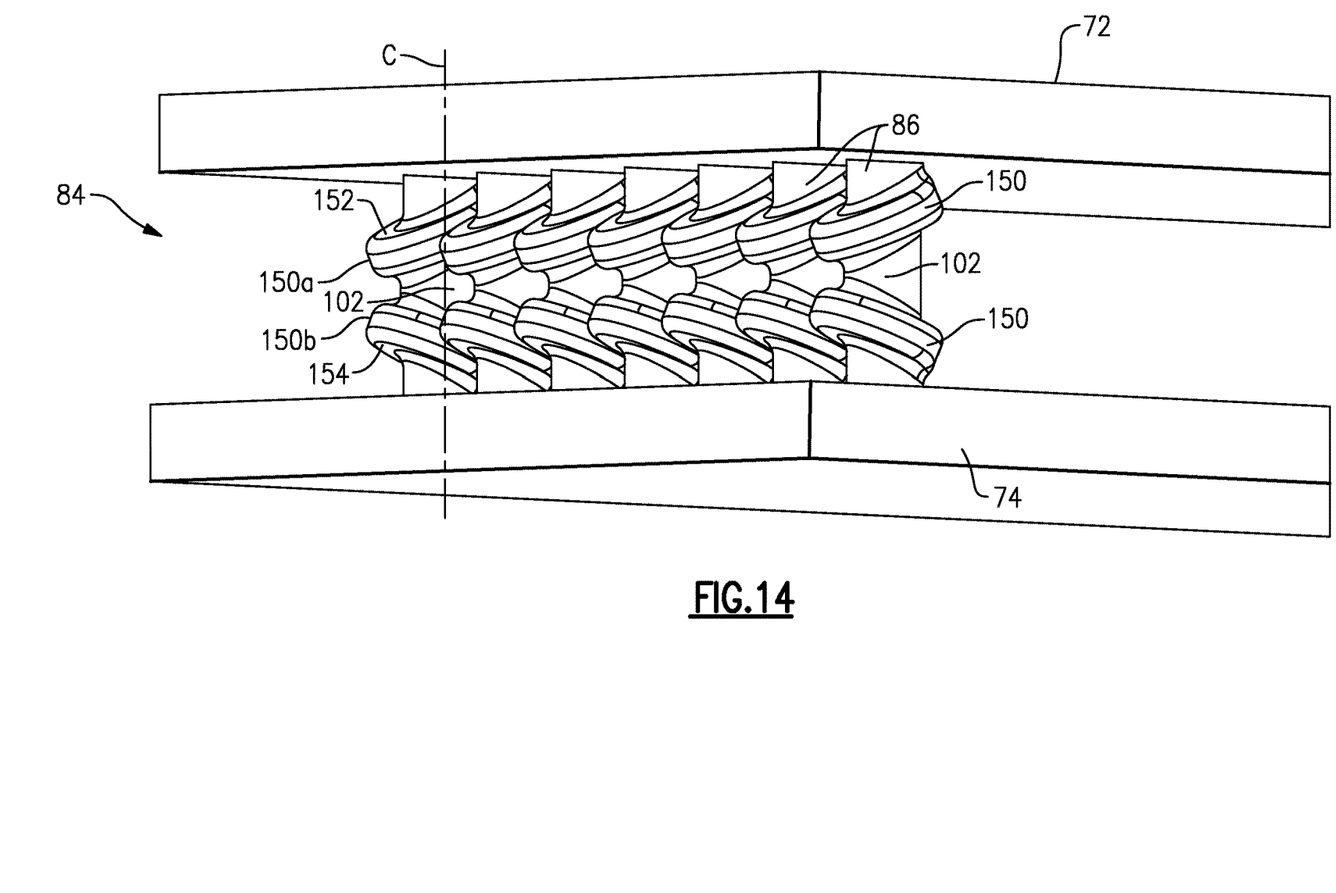
FIG. 14 is a schematic representation of another example of a pedestal.
Figure 15:
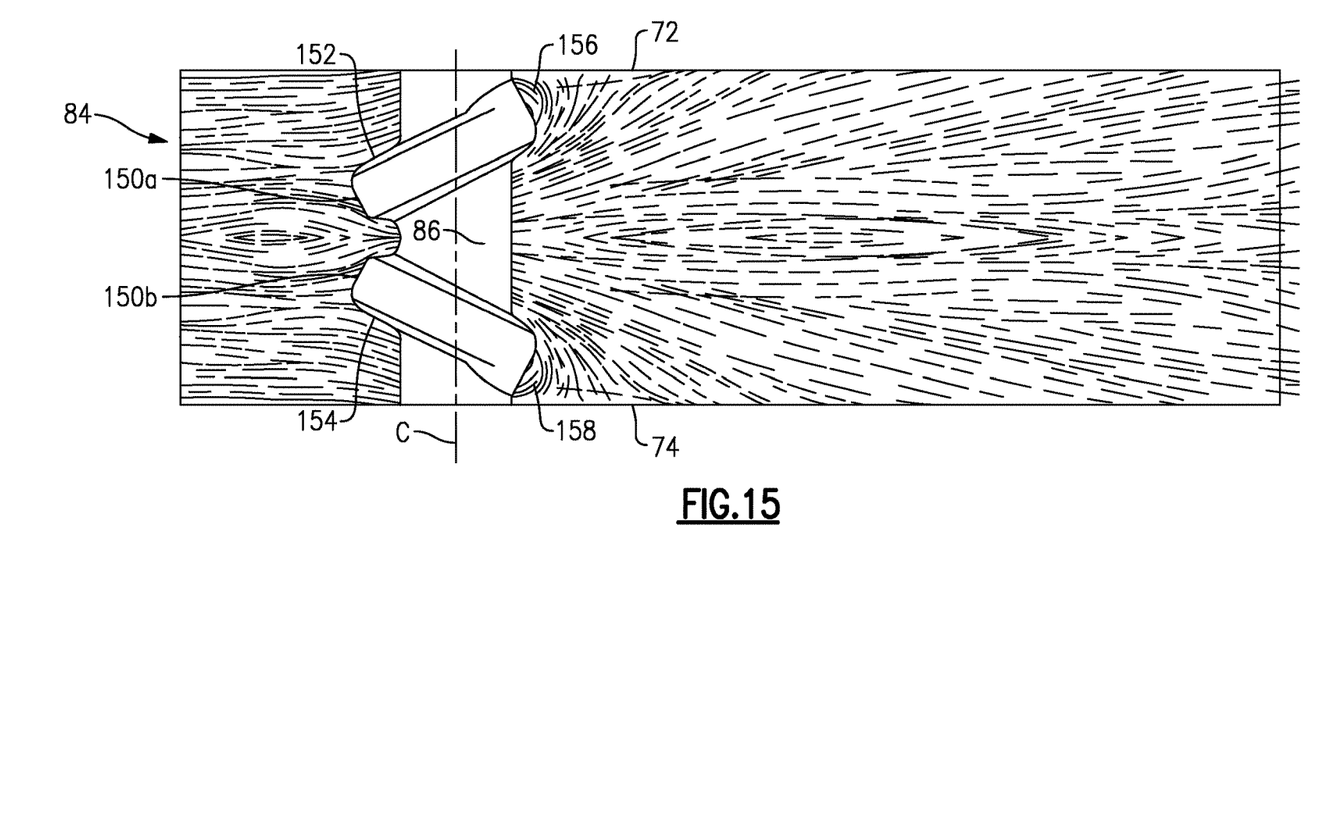
FIG. 15 shows streamline flow in the configuration of FIG. 14.

FIGS. 14-15 show an example where the pedestal 86 includes a plurality of protrusions 150 that comprise ribs, teeth, or fins that extend outwardly from the body 102 relative to the central axis C. At least one protrusion 150a has an angled surface 152 that extends obliquely relative to the central axis C in a first direction. At least one other protrusion 150b has an angled surface 154 that extends obliquely relative to the central axis C in a second, different, direction. As shown in FIG. 15, the first angled surface 152 is orientated to direct cooling flow toward the first side wall 72 as indicated by streamlines 156, and the second angled surface 154 is orientated to direct cooling flow toward the second side wall 74 as indicated by streamlines 158.

In the examples shown above, the pedestals are configured to direct cooling flow against at least one of the side walls 72, 74. Directing the flow towards the walls causes an angled impingement, which results in locally higher heat transfer coefficients to cool the airfoil. Further, the disclosed embodiments show various examples of pedestals as used in a blade. The pedestals could also be used in other components, such as vanes or blade outer air seals for example, to further augment heat transfer as needed.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
   a first side wall;
   a second side wall spaced apart from the first side wall;
   at least one internal cooling channel formed between the first and second side walls; and
   at least one pedestal positioned within the at least one cooling channel and having a body extending from a first end connected to the first side wall to a second end connected to the second side wall, wherein the body defines a central axis extending from the first end to the second end, and wherein the body includes at least one protrusion that is spaced apart from the first and second side walls and which extends circumferentially about the body to generate a vortex downstream of the at least one pedestal.

2. The gas turbine engine component according to claim 1 wherein the at least one protrusion comprises a plurality of protrusions that are each spaced apart from the first and second side walls and that extend circumferentially about the body, and wherein the plurality of protrusions are configured to generate a vortex downstream of the at least one pedestal.

3. The gas turbine engine component according to claim 2 wherein the plurality of protrusions comprises a plurality of gear teeth spaced apart from each other.

4. A gas turbine engine component comprising:
   a first side wall;
   a second side wall spaced apart from the first side wall;
   at least one internal cooling channel formed between the first and second side walls; and
   at least one pedestal positioned within the at least one cooling channel and having a body extending from the first end connected to the first side wall to a second end connected to the second side wall, wherein the body defines a central axis extending from the first end to the second end, wherein the body includes at least one protrusion;
   wherein the at least one protrusion comprises a plurality of protrusions that are spaced from the first and second side walls, and wherein the plurality of protrusions are configured to generate a vortex downstream of the at least one pedestal; and
   wherein the plurality of protrusions comprises a plurality of gear teeth spaced apart from each other, and wherein the plurality of gear teeth extend radially outwardly relative to the central axis to define a tooth height and extend in an axial direction that is parallel to the central axis to define a tooth length that is greater than the tooth height.

5. The gas turbine engine component according to claim 3 wherein the plurality of gear teeth extend circumferentially about the body and are axially spaced apart from each other in a direction along the central axis.

6. The gas turbine engine component according to claim 3 wherein the plurality of gear teeth extend around the body such that each tooth of the plurality of gear teeth is orientated at an oblique angle relative to the central axis.

7. The gas turbine engine component according to claim 1 wherein the at least one protrusion comprises a helical feature that extends circumferentially around the body and is orientated at an oblique angle relative to the central axis.

8. The gas turbine engine component according to claim 2 wherein the plurality of protrusions are orientated at an oblique angle relative to the central axis.

9. The gas turbine engine component according to claim 1 wherein the at least one protrusion includes at least a first angled surface to direct cooling flow toward one of the first and second side walls.

10. The gas turbine engine component according to claim 1 wherein the at least one protrusion includes at least a first protrusion with a first angled surface to direct cooling flow toward the first side wall and at least a second protrusion with a second angled surface to direct cooling flow toward the second side wall.

11. The gas turbine engine component according to claim 1 wherein the component comprises an airfoil.

12. A gas turbine engine comprising:
   a compressor section;
   a combustor section downstream of the compressor section; and
   a turbine section downstream of the combustor section, the turbine section including at least one component comprising a first side wall, a second side wall spaced apart from the first side wall, at least one internal cooling channel formed between the first and second side walls, and at least one pedestal positioned within the at least one cooling channel and having a body extending from a first end connected to the first side wall to a second end connected to the second side wall, wherein the body defines a central axis extending from the first end to the second end, and wherein the body includes at least one protrusion that is spaced apart from the first and second side walls and which extends circumferentially about the body to generate a vortex downstream of the at least one pedestal.

13. The gas turbine engine according to claim 12 wherein the at least one protrusion comprises a plurality of protrusions that are each spaced apart the first and second side walls.

14. The gas turbine engine according to claim 13 wherein the plurality of protrusions comprise a plurality of gear teeth spaced apart from each other.

15. The gas turbine engine according to claim 12 wherein the at least one protrusion comprises a helical feature that extends circumferentially around the body and is orientated at an oblique angle relative to the central axis.

16. The gas turbine engine according to claim 13 wherein the plurality of protrusions are orientated at an oblique angle relative to the central axis.

17. The gas turbine engine according to claim 12 wherein the at least one protrusion includes at least a first protrusion with a first angled surface to direct cooling flow toward the first side wall and at least a second protrusion with a second angled surface to direct cooling flow toward the second side wall.

18. The gas turbine engine according to claim 12 wherein the component comprises an airfoil where the first side wall comprises a pressure side wall and the second side wall comprises a suction side wall, and wherein the pressure and suction side walls connect a leading edge to a trailing edge of the at least one airfoil.

19. The gas turbine engine according to claim 12 wherein the at least one protrusion is positioned to direct cooling flow toward one of the first and second side walls.

20. The gas turbine engine according to claim 12 wherein the at least one protrusion comprises at least a first protrusion positioned to direct cooling flow toward the first side wall and a second protrusion positioned to direct cooling flow toward the second side wall.

21. The gas turbine engine according to claim 12 wherein the at least one protrusion comprises a plurality of protrusions that are spaced from the first and second side walls, and wherein the plurality of protrusions comprises a plurality of gear teeth spaced apart from each other, and wherein the gear teeth extend radially outwardly relative to the central axis to define a tooth height and extend in an axial direction that is parallel to the central axis to define a tooth length that is greater than the tooth height.

22. A gas turbine engine component comprising:
a first side wall;
a second side wall spaced apart from the first side wall;
at least one internal cooling channel formed between the first and second side walls; and
at least one pedestal positioned within the at least one cooling channel and having a body extending from a first end connected to the first side wall to a second end connected to the second side wall, wherein the body includes at least one protrusion, and wherein the body defines a central axis extending from the first end to the second end, and wherein the at least one protrusion comprises a single protrusion that extends outwardly from an upstream side of the body and is spaced apart from the first and second side walls and centrally positioned along the body, and wherein the single protrusion has one or more angled surfaces to direct cooling flow toward at least one of the first and second side walls.

* * * * *